United States Patent
Loh et al.

(10) Patent No.: US 7,226,630 B2
(45) Date of Patent: *Jun. 5, 2007

(54) EDIBLE MOISTURE BARRIER FOR FOOD AND METHOD OF USE PRODUCTS

(75) Inventors: Jimbay Loh, Green Oaks, IL (US); Maria Almendarez, Chicago, IL (US); Tim Hansen, Chicago, IL (US); Laura Herbst, Buffalo Grove, IL (US); Anilkumar Ganapati Gaonkar, Buffalo Grove, IL (US)

(73) Assignee: Kraft Foods Holdings, Inc., Northfield, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/304,446

(22) Filed: Nov. 26, 2002

(65) Prior Publication Data

US 2004/0101601 A1 May 27, 2004

(51) Int. Cl.
*A23D 9/00* (2006.01)
*A23D 9/007* (2006.01)
*A23D 9/013* (2006.01)

(52) U.S. Cl. .................. 426/302; 426/607; 426/608; 426/609; 426/611

(58) Field of Classification Search .................. 426/89, 426/273, 289, 291, 293, 302, 310, 654, 417, 426/442, 607–609, 611
See application file for complete search history.

(56) References Cited

U.S. PATENT DOCUMENTS

| | | | |
|---|---|---|---|
| 2,521,219 A | 9/1950 | Holman et al. |
| 3,293,043 A | 12/1966 | Matz et al. |
| 3,526,515 A | 9/1970 | Werbin et al. |
| 3,696,514 A | 10/1972 | McIntyre et al. |
| 3,965,323 A | 6/1976 | Forker, Jr. et al. |
| 3,997,674 A | 12/1976 | Ukai et al. |
| 4,157,403 A | 6/1979 | Schiffmann et al. |
| 4,271,622 A | 6/1981 | Tippmann et al. |
| 4,293,572 A | 10/1981 | Silva et al. |
| 4,401,681 A | 8/1983 | Dahle |
| 4,448,791 A | 5/1984 | Fulde et al. |
| 4,472,440 A | 9/1984 | Bank |
| 4,504,502 A | 3/1985 | Earle et al. |
| 4,661,359 A | 4/1987 | Seaborne et al. |
| 4,671,963 A | 6/1987 | Germino et al. |
| 4,710,228 A | 12/1987 | Seaborne et al. |
| 4,721,622 A | 1/1988 | Kingham et al. |
| 4,810,534 A | 3/1989 | Seaborne et al. |
| 4,847,098 A | 7/1989 | Langler |
| 4,880,646 A | 11/1989 | Lew et al. |
| 4,915,971 A | 4/1990 | Fennema et al. |
| 4,960,600 A | 10/1990 | Kester et al. |
| 4,999,208 A | 3/1991 | Lengerich et al. |
| 5,035,904 A | 7/1991 | Huang et al. |
| 5,089,278 A | 2/1992 | Haynes et al. |
| 5,130,150 A | 7/1992 | Averbach |
| 5,130,151 A | 7/1992 | Averbach |
| 5,147,670 A * | 9/1992 | Cebula et al. ............. 426/98 |
| 5,248,512 A | 9/1993 | Berberat et al. |
| 5,376,388 A | 12/1994 | Meyers |
| 5,401,518 A | 3/1995 | Adams et al. |
| 5,409,715 A | 4/1995 | Meyers |
| 5,409,717 A | 4/1995 | Apicella et al. |
| 5,433,960 A | 7/1995 | Meyers |
| 5,443,960 A | 8/1995 | Dahlback |
| 5,472,724 A | 12/1995 | Williams et al. |
| 5,518,744 A | 5/1996 | Kaeser et al. |
| 5,520,942 A * | 5/1996 | Sauer et al. ............. 426/289 |
| 5,543,164 A | 8/1996 | Krochta et al. |
| 5,573,793 A | 11/1996 | Saintain |
| 5,705,207 A | 1/1998 | Cook et al. |
| 5,736,178 A | 4/1998 | Cook et al. |
| 5,753,286 A | 5/1998 | Higgins |
| 5,756,140 A | 5/1998 | Shoop et al. |
| 5,789,008 A | 8/1998 | Monte |
| 5,795,603 A | 8/1998 | Burger |
| 5,885,617 A | 3/1999 | Jordan |
| 5,891,495 A | 4/1999 | Cain et al. |

(Continued)

FOREIGN PATENT DOCUMENTS

| | | |
|---|---|---|
| EP | 0421510 | 4/1991 |
| EP | 0509566 | 10/1992 |
| EP | 1 080 643 A1 | 3/2001 |
| EP | 1080642 | 3/2001 |
| EP | 1142494 | 10/2001 |
| JP | A 60224445 | 11/1985 |
| JP | 63146750 | 6/1988 |

(Continued)

OTHER PUBLICATIONS

Lange's Handbook of Chemistry (15th Edition). McGraw Hill (1999). Knovel Database (published online Mar. 2, 2001) [retrieved from internet Aug. 17, 2004] Table 3.2 URL <http://www.knovel.com/knovel2/Toc.jsp?SpaceID=145&BookID=47>.*

Donhowe et al., "Water Vapor and Oxygen Permeability of Wax Films" *JAOCS*, vol. 70, No. 9, Sep. 1993.

Hagenmaier, et al., "Edible Coatings from Morpholine-Free Wax Microemulsions", *J. Agric. Food Chem.* 45, 349-352, 1997.

(Continued)

*Primary Examiner*—Arthur L. Corbin
(74) *Attorney, Agent, or Firm*—Fitch, Even, Tabin & Flannery

(57) ABSTRACT

An edible moisture barrier for food products is provided. This edible moisture barrier is highly effective in preventing moisture migration within a multi-component food product between food components having different water activities and/or moisture contents at a given storage temperature. The moisture barrier includes an edible microparticulated high melting lipid having a melting point of 70° C. or higher and an edible low melting triglyceride blend.

22 Claims, 4 Drawing Sheets

U.S. PATENT DOCUMENTS

| | | | |
|---|---|---|---|
| 5,928,692 | A | 7/1999 | Mayfield |
| 5,939,114 | A | 8/1999 | Cain et al. |
| 6,038,542 | A | 3/2000 | Ruckdashel |
| 6,039,988 | A | 3/2000 | Monte |
| 6,066,347 | A | 5/2000 | Prasad et al. |
| 6,110,515 | A * | 8/2000 | Clechet et al. .............. 426/306 |
| 6,139,885 | A | 10/2000 | Jouanneau et al. |
| 6,146,672 | A | 11/2000 | Gonzalez et al. |
| 6,177,112 | B1 | 1/2001 | Dufort et al. |
| 6,461,654 | B1 | 10/2002 | Cain et al. |
| 6,472,006 | B1 | 10/2002 | Loh et al. |
| 6,500,474 | B2 | 12/2002 | Cross et al. |
| 6,503,546 | B1 | 1/2003 | Ferrari-Philippe et al. |
| 2003/0008037 | A1 | 1/2003 | Valenzky, Jr. et al. |
| 2003/0008038 | A1 | 1/2003 | Valenzky, Jr. et al. |
| 2003/0077356 | A1 | 4/2003 | Campbell et al. |

FOREIGN PATENT DOCUMENTS

| | | |
|---|---|---|
| WO | WO 92/01394 | 2/1992 |
| WO | WO 97/15198 | 5/1997 |
| WO | WO 99/51102 | 10/1999 |
| WO | WO 01/97625 A1 | 12/2001 |
| WO | WO 03/007736 | 1/2003 |
| WO | WO 03/039852 | 5/2003 |

OTHER PUBLICATIONS

Greener et al., "Barrier Properties and Surface Characteristics of Edible, Bilayer Films", *Journal of Food Science*, vol. 54, No. 6, 1989.

Kester et al., "The Influence of Polymorphic Form on Oxygen and Water Vapor Transmission through Lipid Films", *JAOCS*, vol. 66, No. 8, Aug. 1989.

Kester et al., "Resistance of Lipid Films to Water Vapor Transmission", *JAOCS*, vol. 66, No. 8, Aug. 1989.

Landmann et al., "Permeability of Some Fat Products to Moisture", *The Journal of the American Oil Chemists' Society*, vol. 37, Jan. 1960.

Lovegren et al., "Permeability of Acetostearin Products to Water Vapor", *Agricultural and Food Chemistry*, vol. 2., No. 11, May 26, 1954.

Martin-Polo et al., "Hydrophobic Films and Their Efficiency Against Moisture Transfer. 2. Influence of the Physical State", *J. Agric. Food Chem.*, vol. 40, No. 3, 1992.

Kamper et al., Water Vapor Permeability of Edible Bilayer Films, *Journal of Food Science*, vol. 49, 1984.

Greener et al., Evauluation of Edible, Bilayer Films for Use as Moisture Barriers for Food, *Journal of Food Science*, vol. 54, No. 6, 1989.

Kamper et al., Use of Edible Film to Maintain Water Vapor Gradients in Foods, *Journal of Food Science*, vol. 50, 1985.

Kester et al., "An Edible Film of Lipids and Cellulose Ethers: Barrier Properties to Moisture Vapor Transmission and Structural Evaluation", *Journal of Food Science*, vol. 54, No. 6, 1989.

Kamper et al. Water Vapor Permeability of an Edible, Fatty Acid, Bilayer Film, *Journal of Food Science*, vol. 49, 1984.

Morillon et al., "Factors Affecting the Moisture Permeability of Lipid-Based Edible Films: A Review", *Critical Reviews in Food Science and Nutrition*, 42(1):67-89, 2002.

Rhodes et al., "Coatings for Controlled-Release Drug Delivery Systems", *Drug Development and Industrial Pharmacy*, 24(12), 1139-1154, 1998.

Shukla, "What's a Plastics Extruder Doing in the Food Business?", *Cereal Foods World*, vol. 41, No. 8, Aug. 1996.

Chen, "Functional Properties and Applications of Edible Films Made of Milk Proteins", *J Diary Sci*, 78:2563-2583, 1995.

Kester et al., "An Edible Film of Lipids and Cellulose Ethers: Performance in a Model Frozen-Food System", *Journal of Food Science*, vol. 54, No. 6, 1989.

Koelsch et al., "Functional, Physical, and Morphological Properties of Methyl Cellulose and Fatty Acid-Based Edible Barriers", *Lebensm.-Wiss.u.-Technol.*, vol. 25, 1992.

EP Search Report, EP 1472934, 2004.

EP Search Report, EP 1586242, 2005.

EP Search Report, EP 1247460, 2003.

EP Search Report, EP 1449439, 2004.

Lange's Handbook of Chemistry (15th Edition). McGraw Hill (1999). Knovel Database (published online Mar. 2, 2001) [retrieved from Internet on Aug. 17, 2004] Table 3.2 URL <http://www.knovel.com/knovel2/Toc.jsp?SpaceID=145&BookID=47>.

The Edible Oils Co. First published online Jul. 1, 2003 [retrieved from Internet Sep. 14, 2004] URL<http://edibleoils.net/hydrogenated_soybean_oil_spec.htm>.

Robinson, "Building a Better Cheese", *Food R & D*, Dairy Field's Ingredient Technology Section, vol. 181(4), pp. 39-41, 1998.

Hui, "Edible Oil and Fat Products: Products and Application Technology", *Wiley-Interscience*, 233750, p. 340. 1999.

EP Search Report, EP 04250728, 2004, 4 pages.

* cited by examiner

EDIBLE MOISTURE BARRIER FOR FOOD AND METHOD OF USE PRODUCTS

The present invention relates to an improved, edible, lipid-based, moisture barrier for food products. More particularly, the edible moisture barrier is useful in preventing moisture migration within a multi-component food product. The edible moisture barrier of this invention is formed from a composition that includes a microparticulated high melting lipid as fat crystal control agent and a low melting triglyceride blend with specific solid fat content at targeted storage temperature of the food products.

BACKGROUND

For many food products, moisture levels must be maintained if the product is to exhibit optimum organoleptic properties, quality, and taste. Moisture migration in finished food products can seriously compromise quality, stability, and organoleptic properties. In addition, many chemical and enzymatic deteriorative reactions proceed at rates partially governed by the moisture content of foods. Excessive rates of these reactions can promote deleterious changes in the flavor, color, texture, and nutritive value of food products.

In multi-component food products, particularly those having components with different moisture contents and water activities (e.g., prepackaged cheese and crackers or prepackaged bagel and cheese cream products), moisture can migrate between adjacent components, altering the component's characteristics and organoleptic properties. In addition to compromising the quality of finished food products, moisture migration can hinder production and distribution of food products. Thus, for example, the cheese in a cheese/cracker product could dry out while, at the same time, the cracker losses its crispness.

One method to prevent moisture migration in foods involves coating one or more surfaces of the food product with an edible moisture barrier. Such barriers should have a low moisture permeability in order to prevent the migration of water between areas of differing water activities. In addition, the barrier should cover the food surface completely, including crevices, and adhere well to the food product surface. The moisture barrier should be sufficiently strong, soft, and flexible to form a continuous surface that will not crack upon handling, yet can be easily penetrated during consumption. In addition, the barrier film's organoleptic properties of taste, aftertaste, and mouthfeel should be imperceptible so that the consumer is not aware of the barrier when the food product is consumed. Finally, the moisture barrier should be easy to manufacture and easy to use.

Because lipids, such as oils, fats, and waxes, are composed of lipophilic water insoluble molecules capable of forming a water impervious structure, they have been investigated for use in moisture barrier films. With respect to oleaginous materials derived from lipids (i.e., sucrose polyesters, acetylated monoglycerides and the like) and/or other film forming lipids, it has been shown that, unless an undesirably thick coating is used, the barrier is not sufficiently effective for food products requiring long shelf life. Such film forming lipids tend to become unstable under normal, practical use condition and loss film integrity and barrier effectiveness. In addition to structural instability, such as oiling out or cracking upon handling or with changes in temperatures, such lipid-based moisture barriers have disadvantages of being organoleptically unacceptable (greasy or waxy mouthfeel).

Accordingly, many of the barriers in the art use a water-impermeable lipid in association with hydrocolloids or polysaccharides such as alginate, pectin, carrageenan, cellulose derivatives, starch, starch hydrolysates, and/or gelatin to form gel structures or crosslinked semi-rigid matrixes to entrap and/or immobilize the nonaqueous or lipid material. In many cases these components are formed as bilayer films. These bilayer films may be precast and applied to a food surface as a self-supporting film with the lipid layer oriented toward the component with highest water activity. See, for example, U.S. Pat. No. 4,671,963 (Jun. 9, 1987), U.S. Pat. No. 4,880,646 (Nov. 14, 1987), U.S. Pat. No. 4,915,971 (Apr. 10, 1990), and U.S. Pat. No. 5,130,151 (Jul. 14, 1992). There are, however, a number of drawbacks associated with these moisture barriers. The hydrocolloids themselves are hydrophilic and/or water soluble and thus tend to absorb water with time. The absorption of water by the hydrophilic material in moisture barrier is greatly accelerated while the film is directly in contact with foods having a water activity ($A_w$) above 0.75. In addition, some hydrocolloids tend to make the barriers fairly stiff, requiring the addition of a hydrophilic plasticizer (e.g., polyol) to increase flexibility. These plasticizers are often strong moisture binder themselves thus promoting moisture migration into the barriers and decreased structural stability and effectiveness of the barriers. Furthermore, the texture and the required thickness of some of these barriers may make their presence perceptible and objectionable when the product is consumed. Additional processing steps (casting and drying) required to form these films make them difficult to use in high speed commercial production.

SUMMARY

The present invention provides an edible moisture barrier for food products. This edible moisture barrier is highly effective in preventing moisture migration within a multi-component food product between food components having different water activities and/or moisture contents at a given storage temperature. The edible moisture barrier of this invention is formed from a composition comprising an edible triglyceride blend having a melting point of about 35° C. or lower and an edible microparticulated high melting lipid having a melting point of about 70° C. or higher. In an important aspect of the invention, the edible microparticulated high melting lipid has a volume average particle size of 10 microns or less to provide an adequate amount of lipid particles with a particle size of 0.1 microns or less. This composition has unique thermomechanical properties that makes it ideal as an edible moisture barrier for use in food products.

In an important aspect of the invention, the moisture barrier composition is effective for providing a barrier where solid fat content (SFC) does not change more than 5% with +5° C. to −5° C. of the storage temperature of the food product. Changes of greater than 5%, could compromise the effectiveness of the barrier. In the most important aspect of the invention, SFC of the barrier at the storage temperature of the product is 50 to 70%, preferably SFC is 55 to 70% and most preferably, SFC is 60 to 65% at the storage temperature of the product. The moisture barrier is further made organoleptically desirable for providing a change in SFC of at least 20% at temperature from 20° C. to 37° C. and a SFC of less than 35% at a temperature above 37° C. These characteristics provide a moisture barrier with a good, rapid and clean melt, and a non-waxy mouthfeel.

Typically, the moisture barrier composition contains 65 to 99 weight percent of the edible, low melting triglyceride blend and 1 to 35 weight percent of the edible, microparticulated high melting lipid; preferably, the composition contains 75 to 95 weight percent of the edible, low melting triglyceride blend and 5 to 25 weight percent of the edible, high melting lipid; and most preferably the composition contains 85 to 92 weight percent of the edible, low melting triglyceride blend and 8 to 15 weight percent of the edible, high melting lipid. In an important aspect of the invention, the edible microparticulated, high-melting lipid is calcium stearate.

The present invention also provides an edible moisture barrier and a method for preventing moisture migration between food components having different moisture levels. In this aspect of the invention, the moisture barrier is particularly effective for use in multicomponent foods with at least one component having an $A_w$ of greater than 0.75. The edible moisture barrier of the invention has a low moisture permeability and is easy to manufacture and use with a variety of food products. The edible moisture barrier of the invention is specially formulated for intended storage temperature of the food product and is effective for covering a food surface completely and providing a barrier that is sufficiently strong, stable and non-brittle to form a surface that will resist cracking during handling and storage (either at refrigeration or ambient temperatures), but is easily penetrated during consumption. The edible barrier of the invention has organoleptic properties of taste, aftertaste, and mouthfeel that are essentially imperceptible such that the consumer is unaware of the presence of the barrier when the product is consumed. The moisture barrier of the invention is effective for reducing moisture migration between foods over 21 days storage by at least 90 percent, more preferably by at least 99 percent and most preferably by at least 99.9 percent, as compared to food where no moisture barrier is present. The moisture barrier of the invention is further effective for increasing refrigerated shelf life of a food product containing the moisture barrier by at least 8 times and more preferably by at least 16 times as compared to food product where no moisture barrier is present. This generally translates into a refrigerated shelf life for a multicomponent food product of four months or longer.

The present invention also provides a method for reducing moisture migration between food components. In this aspect of the invention, the edible moisture barrier is brought into contact with a food component in an amount effective for reducing moisture migration from one food component to another. Generally, the edible moisture barrier is applied to the food component to form an essentially continuous barrier layer at least 20 microns thick, preferably 100 microns to 1 mm thick, and more preferably 200 to 500 microns thick.

DETAILED DESCRIPTION

Figure 1:
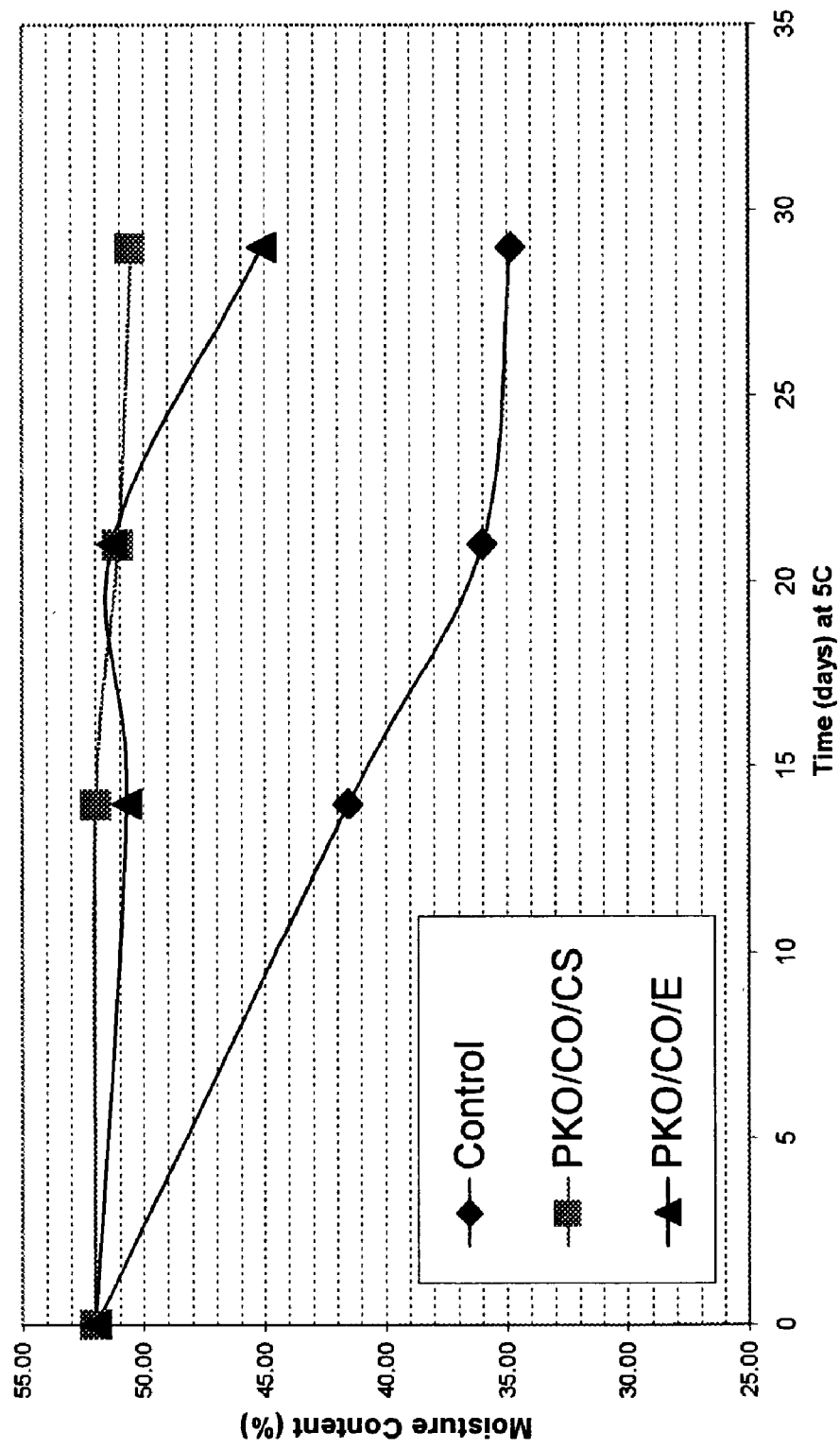
FIG. 1 shows changes in moisture content of cheese with and without the protection of selected moisture barriers.
Figure 2:
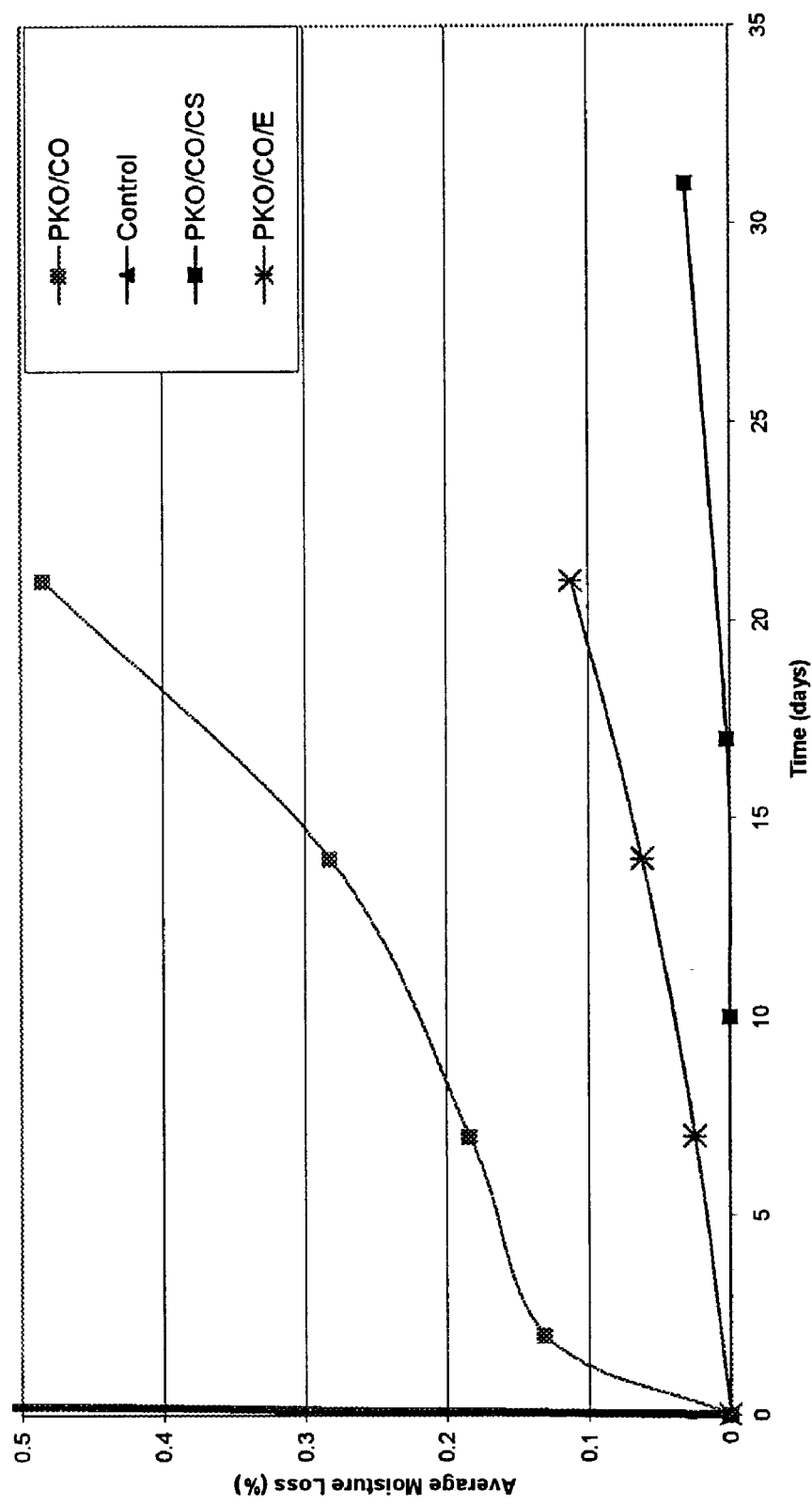
FIG. 2 shows barrier effectiveness of selected barrier compositions against control (no barrier).

The edible moisture barrier of the present invention has organoleptic properties of taste, aftertaste, and mouthfeel that are imperceptible such that the consumer is unaware of the presence of the barrier when the product is consumed. The moisture barrier is self-supported which eliminates the need for a base polymer network/film, thus eliminating the need of casting, coating or drying with a polymeric base layer and resulting undesirable textured defects, such as hardness or chewiness. Indeed, the edible moisture barrier of the present invention is rapid and clean melting, is free from residues, and has a creamy (i.e., smooth), non-waxy mouthfeel.

Additionally, the edible moisture barrier composition of the present invention posses a stable network structure supported by numerous, fine crystalline fat particles which resist the tendency to recrystallize, bloom or crack and provides good stability at targeted storage temperature of the food product. The specific fat/oil ratio defined by SFC is tailored and maintained for actual storage temperatures. This stable, fine fat crystal network also help to immobilize liquid oil fraction in the barrier. Overall, this provides a stable, water resistant, nonporous lipid layer resulting in a more effective barrier and a more stable fat matrix, such that cracking occurring during cooling and storage may be minimized. Specific SFC is also designed for rapid melting at body temperatures to impart a pleasant or nondetectable mouthfeel and for ease of application by, for example, spraying, brushing or enrobing.

Definitions

Unless defined otherwise, all technical and scientific terms used herein have the same meaning as commonly understood by one of ordinary skill in the art to which this invention belongs. All patents and publications referred to herein are incorporated by reference herein. For purposes of the present invention, the following terms are defined below.

As used herein, "edible material" includes any material that is generally regarded as safe by FDA and does not have to be removed from the food component before it is eaten (i.e., a material that can be safely chewed and ingested by the consumer).

As used herein, "barrier" or "moisture barrier" is understood to describe a thin continuous structure or layer that is essentially impermeable to moisture migration through it, and which coats an inner or outer surface of a food product. The barrier may be described as a coating, film, or membrane. The barrier can be placed between components having differing water activities within the food product to prevent or significantly reduce moisture migration between the components or on the outer surface of the food product to prevent or significantly reduce moisture migration between the food product and the ambient environment. The moisture barrier of this intention is designed to be used in direct contact with moist foods and to be effective against moisture migration through vapor equilibrium and/or liquid diffusion. For purposes of this invention, in the case of preventing moisture migration between the food product and the ambient environment, the first food component would be considered to be one or more outer surfaces of the food product and the second food component would be considered to be the ambient environment.

As used herein, "water activity" ($A_w$) is the ratio of vapor pressure of water in the food of interest and vapor pressure of pure water at the same temperature.

As used herein "lipid" refers to any of a group of substance that in general are soluble in or miscible with ether, chloroform, or other organic solvents for fats and oils (technically, triglycerides of fatty acids, short for triglycerides) but are practically insoluble in water. Lipids may be classified as simple lipids, compound lipids or derived lipids.

Simple lipids include esters of fatty acids with alcohols. Fats and oils are esters of fatty acids with glycerol, and waxes are esters of fatty acids with alcohols other than glycerol.

Compound lipids include phospholipids, cerebrosides or glycolipids, and others, such as sphigolipids, and carotenoids.

Derived lipids include substances derived from natural lipids (simple or compound) and include fatty acids, fatty alcohols and sterols, hydrocarbons and emulsifiers (artificially derived, surface active lipids).

"Fat/Oil ratio" or "solid fat content (SFC)" is commonly used to describe the rheology and phase composition of lipids. Fat is solid at a given temperature, whereas oil is liquid. The fat/oil of a given lipid is not a constant but a function of temperature. For example, butter can be regarded as mainly solid fat (~70% fat) at 0° C. and becomes plastic (~15% fat) at room temperature and completely liquid oil (0% fat) above 40° C. Therefore, it is possible to tailor a blend of triglycerides that has any fat/oil ratio at a given temperature(s) except for having a high fat/oil ratio at a very high temperature. When a lipid-based fat crystal control agent is used in the composition, such agent itself is also often lipid, hence, the actual SFC of a barrier must include the fat and oil fractions from the fat crystal control agent. Fat/oil ratio in a barrier varies with temperature and is important to barrier effectiveness and stability at actual storage temperature (e.g. 5° C. for refrigerated storage) of food product. It is also an important aspect of this invention that barrier composition alone without considering its exact SFC profile can not provide superior barrier effectiveness. In other words, an effective barrier composition at ambient temperature will likely fail at refrigeration temperature and vice versa if its SFC changes significantly between 20 and 5 C. The fat/oil ratio is also important for mouthfeel/sensory acceptability at 25 to 37° C., and is important for ease of application at the temperature (typically >40° C.) for transport or application (for example, spraying).

"Barrier effectiveness" was evaluated analytically by a cheese-cup method. A control was prepared by using a water impermeable plastic cup packed with Kraft Velveeta brand process cheese (Aw=0.94) and placed in a constant humidity chamber over saturated magnesium chloride solution with an equilibrium relative humidity of about 33% at refrigeration temperature (about 5 C+/−1 C for all examples). Moisture or weight loss is monitored over a 21-day period as a reference point for the comparison of barrier effectiveness. Too short of a storage time often gives unreliable results that can not be extrapolated to longer term (for example 4 months) storage performance. Similarly prepared cheese-cups coated with selected barrier composition with a thickness of about 300 microns were compared to control under identical condition in terms of "% moisture loss" verse storage time. Average of at least 4 replicates are required and used for comparison purpose. This method simulates more closely the actual product application condition in which the barrier is in direct contact with a moist food component.

Microparticulated High Melting Lipid

The moisture barrier of the present invention includes microparticulated high melting lipid having a melting point of 70° C. or higher. The microparticulated, high-melting lipid is effective for promoting the formation of small, fat crystals (from triglyceride blend during cooling) that effectively immobilize remaining liquid oil fraction of the triglyceride blend thus preventing liquid oil from draining from the fat crystal network. During subsequent storage, microparticulated fat crystal control agent is also effective in stabilizing the three dimensional solid fat crystal network made of numerous small fat crystals. Presence of smaller fat crystals provides a better moisture barrier.

Preferred edible, high melting lipids have melting points of about 70° C. or higher, and more preferably about 100° C. or higher. For purposes of this invention, the term "edible, high melting lipids" includes edible long chain fatty acids, their monoglycerides, diglycerides, and triglycerides, their alkaline metal salts, and other derivatives thereof. Other natural or synthetic, food-approved, high melting lipids or lipid-like substances such as fatty alcohol (wax), paraffin and sucrose polyesters can also be used. Generally, the edible, high melting lipids are formed from long chain fatty acids having at least about 16 carbon atoms and preferably about 18 to about 24 carbon atoms; preferably, the long chain fatty acids are saturated. Suitable saturated long chain fatty acids used to form the edible, high melting lipids include, for example, palmitic, stearic acid, arachidic acid, behenic acid, lignoceric acid, and the like; their derivatives, including, for example, glyceryl monostearate, glycerol distearate, glycerol tristearate, calcium stearate, magnesium stearate, high melting sucrose polyesters, high melting fatty alcohols, high melting waxes, high melting phospholipids and the like, as well as mixtures thereof In an important aspect of the invention, the high melting lipid is microparticulated. Any conventional micromilling equipment can be used to provide the microparticulated high melting fat. Suitable micromilling equipment includes, for example, ball mills, colloid mills, fluid energy mills, pin/disk mills, hammer mills, and the like. The edible high melting lipid is micromilled at a temperature of 40 to 70° C., preferably 45 to 60° C. The micromilling is effective for providing numerous fragments with a particle size of 0.1 microns or less which are believed to be the functional component responsible for fat crystal control and stabilization. In such microparticulated high melting lipid, the volume average particle size as measured by a Horiba LA-900 laser particle sizer (Horiba Instrument, Inc. Irvine, Calif.) is about 10 microns or less preferably 1 to 5 microns. Generally, the particle size is preferably measured at 20° C. by dispersing microparticulated high melting lipid in soybean oil using a sonicator prior to measurement.

In a very important aspect of the invention, the microparticulated high melting fat is micromilled calcium stearate. Micromilled calcium stearate is stable, as it has a melting point of about 145° C., is, water insoluble, is an approved GRAS food ingredient, and has a reasonable cost.

Low Melting Triglyceride Blend

The edible moisture barrier of the invention includes an edible low melting lipid blend having a melting point of 35° C. or lower and having a SFC at targeted storage temperature of the food product of 50 to 70%, preferably 55 to 70% and most preferably 60 to 65%. For practical purpose, the low melting lipid preferably comprises a blend of triglycerides of fatty acids including natural, (fully or partially) hydrogenated and/or fractionated edible fats and oils and is referred to "edible, low melting triglyceride blend" hereof. Modified or synthetic lipids such as acetylated monglyceride and paraffin oil may also be used, but less preferred. Suitable edible, low melting triglyceride blend generally include a blend of one or more hydrogenated or non-hydrogenated oils having the desired SFC profile. Suitable edible, low melting triglycerides include oxidatively stable, natural, or hydrogenated and/or fractionated vegetable oils or animal fats including, for example, coconut oil, rapeseed oil, soybean oil, palm oil, palm kernel oil, sunflower oil, corn oil, canola oil, cottonseed oil, peanut oil, cocoa butter, anhydrous milkfat, lard, beef fat, and the like, as well as mixtures thereof. Preferred edible, low melting triglycerides should be stable against oxidation or hydrolysis and may include canola oil, palm oil, palm kernel oil, coconut oil, partially hydrogenated soybean oil and mixtures thereof. Selection of low melting triglyceride blend is critical to meet the SFC specifications of this invention to ensure superior barrier effectiveness, desirable mouthfeel characteristics and acceptable handling properties of the final barrier composition. For example, the SFC of the barrier composition of this invention is also design to be no more than 35% at a temperature above 37° C., preferably less than 20%. In addition, the difference in SFC between 20° C. and 37° C. of the barrier composition is set at least 20%, and preferably more than 30%.

Application of Moisture Barrier

Moisture barrier was first heated to about 40 to 50 ° C. at which nearly all the fats from low melting triglyceride blend are melted, whereas the microparticulated, high melting lipid is not physically altered or melted. Where inhibition of moisture migration between adjacent portions of a food product having different water activities is desired, the moisture barrier composition can be applied to the contacting surface of one (or both) portions and allowed to cool to below 20° C., before the portions are brought together. The moisture barrier composition will have a viscosity of 20 to 2000 cps at a temperature of from 40° C. to 50° C. Where inhibition of moisture migration between a food product and the ambient environment is desired, the moisture barrier composition can be applied to one or more of the outer surfaces of the food product and allowed to cool. In an important aspect of the invention, desirable particle sizes can be obtained without controlled cooling rates due to the use of microparticulated high melting lipid. This is an unexpected advantage over the use of other types of fat crystal control agents such as high melting waxes and emulsifiers by first melting such fat crystal control agents in triglyceride blend. Conventional fat crystal control or seeding agents may be used if a proper type of non-microparticulated fat crystal control agent and controlled cooling rate are used.

In one practice of the invention, the barrier is applied by immersing the food product, or simply the surface thereof to be coated, into a melted or molten moisture barrier composition, removing the food product, and allowing the coated product to cool. In another practice of the invention, the molten film is applied by brushing or otherwise applying the composition to the desired surface(s) of the product. Suitable techniques include, for example, dipping, pan coating, and use of a fluidized bed. In still another practice of the invention, the film can be applied using a spray, including atomized spray, air-brushing, and the like. Generally, the edible moisture barrier is applied to the food component to form an essentially continuous barrier layer at least 20 microns thick, preferably 100 microns to 1 mm thick, and more preferably 200 to 500 microns thick.

The following examples illustrate methods for carrying out the invention and should be understood to be illustrative of, but not limiting upon, the scope of the invention which is defined in the appended claims.

EXAMPLES

Example 1

A barrier composition may be prepared by melting at 50° C. palm kernel oil (PKO), canola oil (CO) and 10% of micromilled calcium stearate (CS—with a volume average particle size <2 microns) at PKO/CO/CS ratio of 58.5, 31.5 and 10 to give the following SFC profile: This barrier composition is designed for use at storage temperature of 5° C.

| Temp (C.) | SFC |
|---|---|
| 0 | 64.5 |
| 5 | 60.5 |
| 10 | 55.8 |
| 15 | 49.8 |
| 20 | 38.9 |
| 25 | 24.1 |
| 30 | 14.2 |
| 40 | 10 |

Example 2

A more preferred composition can be similarly obtained with the following SFC profile in which SFC remains nearly constant to maintain barrier effectiveness against temperature fluctuation by melting and blending PKO, CO and CS at a weight ratio of 56.3, 33.7 and 10. Near targeted storage temperature (5° C.), the SFC remains nearly constant

| Temp (C.) | SFC |
|---|---|
| 0 | 63 |
| 5 | 63 |
| 10 | 62 |
| 20 | 48 |
| 25 | 17 |
| 30 | 12 |
| 40 | 10 |

Example 3

A 72/28 blend of PKO and CO with 0.2% Diglycerol Monoleate (TS-ED 290, Danisco, Kans.) added as a non-microparticulated fat crystallization control agent giving the SFC profile as shown below (72:29:0.2 is the ratio). The method of preparation is different, at least in principle. All three components are blended and heated to about 70 C or till the emulsifier is completely melted.

| Temp (C.) | SFC |
|---|---|
| 0 | — |
| 5 | 65.8 |
| 10 | 62.8 |
| 15 | 57.3 |
| 20 | 46.8 |
| 25 | 25.2 |
| 30 | 12.0 |
| 40 | 0.3 |

Relative barrier effectiveness was compared against control and a reference barrier without fat crystal control agent using the cheese-cup method. Results shown in FIG. 1 clearly demonstrated that the unprotected control loses more than 20% of moisture during the first 7 days of storage and superior barrier effectiveness of barrier composition from Example 1 (PKO/CO/CS) and barrier composition from Example 3 (PKO/CO/E). FIG. 1 also confirms that the moisture content of cheese practically remains unchanged with the protection of the inventive barrier composition from Example 1 and 3, whereas, the cheese of unprotected control becomes dry, crumbly and objectionable in flavor and appearance after less than 1 week of storage.

Example 4

Figure 3:
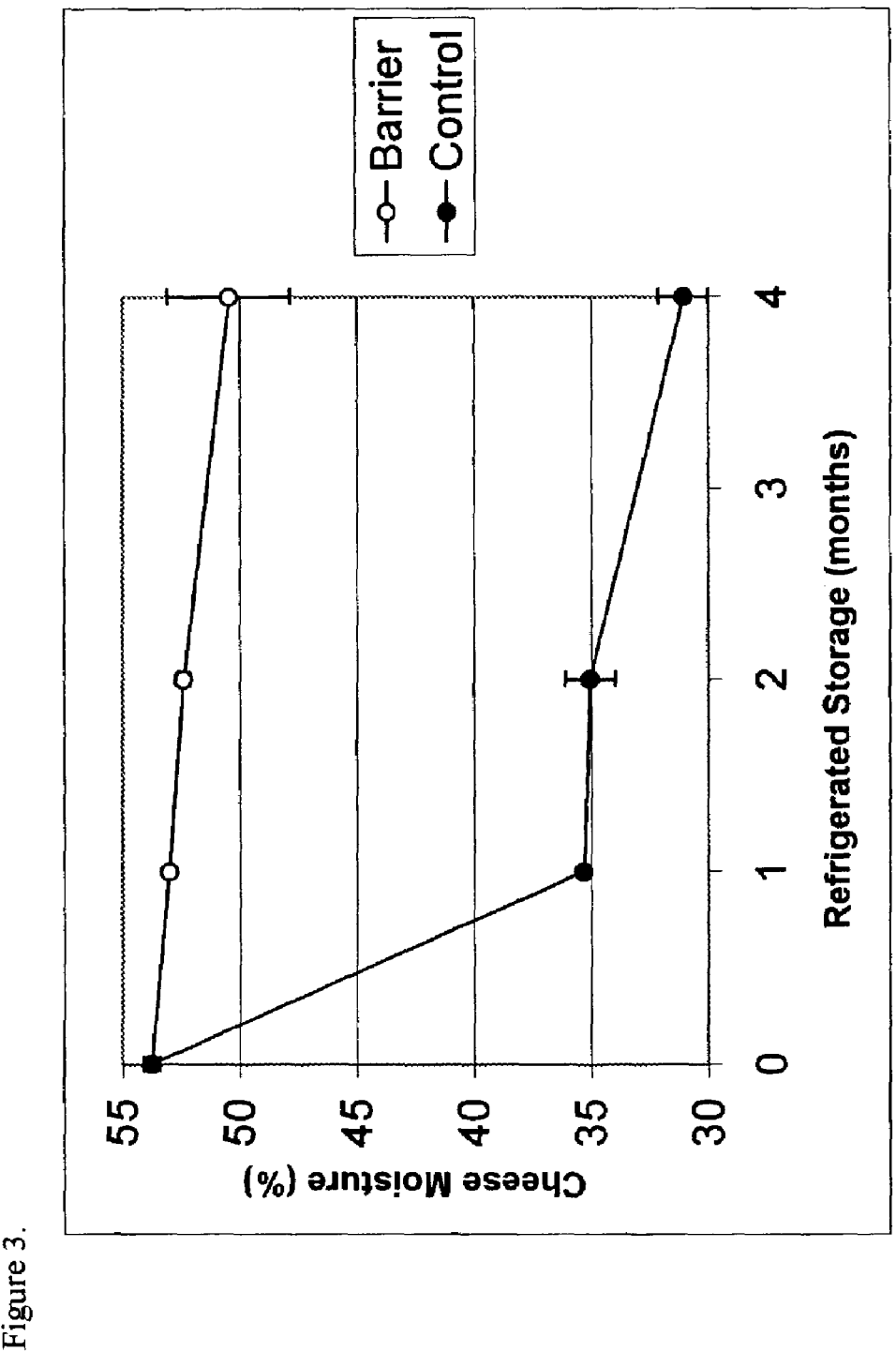
FIG. 3 illustrates moisture loss of cream cheese without (Control) and with the protection of selected barriers.

An experiment using actual cream cheese (Philadelphia brand) and bagel (Lender's) sandwich also indicated that barrier-treated cream cheese maintained its characteristic cream cheese texture and flavor, whereas unprotected cream cheese turned pasty in texture, yellowish in color and nearly completely lost its flavor. An edible moisture barrier composition with SFC of 65% at 5 C, composed of 58.8% PKO, 30.2% CO and 11% CS, was used to reduced moisture migration in this example to demonstrate commercial feasibility of 4 months of refrigerated shelf life. The cream cheese moisture, the best indicator of sandwich quality, dropped slightly (3%) for the sample coated with the barrier compared to a sample without barrier (23%) after 4 months of refrigeration storage. See FIG. 3.

Example 5

Figure 4:
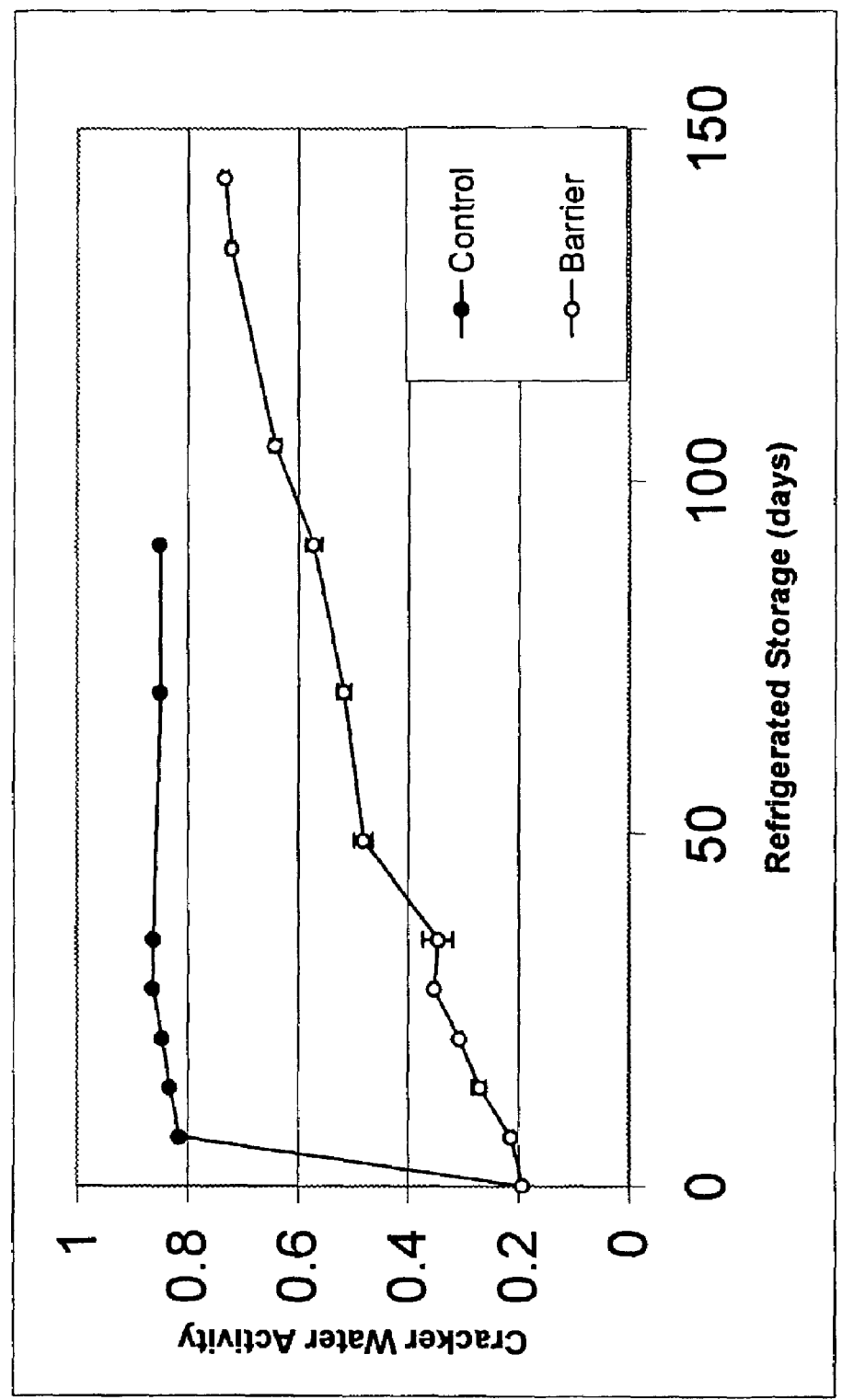
FIG. 4 illustrates change in Aw of cracker without (Control) and with the protection of an inventive barrier.

A similar experiment using another sandwich model containing Deluxe cheese slice and Ritz cracker (both Kraft brand) demonstrated slowed moisture migration from cheese to cracker over 120 days refrigerated storage. A thin layer of barriers with a SFC of 63% at 5 C prepared from 54% acetylated monoglycerides and 46% anhydrous milk fat was applied at 50–60° C. via spraying onto the surface of a process cheese slice. The treated cheese slice was placed between 2 pieces of crackers and the sample was stored at 5° C. in a hermetically sealed plastic wrapper. The barrier-treated samples remained significantly cruncher in texture than the untreated control. This is supported by the water activity data shown in FIG. 4.

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. An edible moisture barrier composition comprising:
   from 1 to 35 weight percent of an edible microparticulated high melting lipid having a melting point of 70° C. or higher and a volume average particle size of less than 10 microns; and
   from 65 to 99 weight percent of an edible low melting triglyceride blend having a melting point of 35° C. or less, the moisture barrier composition having a solid fat content of 50 to 70 weight percent at a storage temperature of about 5° C., a solid fat content of less than 35 weight percent above 37° C. wherein the solid fat content does not change more than 5 weight percent at a storage temperature of 0 to 10° C., the moisture barrier composition having sufficient lipid particles, with a particle size of not more than 0.1 micron, effective to prevent liquid oil in the moisture barrier composition from draining from a fat crystal network formed in the barrier composition.

2. The edible moisture barrier composition of claim 1, wherein the edible, low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride and mixtures thereof.

3. The edible moisture barrier composition of claim 1, wherein the barrier composition comprises from 5 to 25 weight percent of an edible microparticulated high melting lipid having a melting point of 100° C. or higher and a volume average particle size of less than 5 microns, and from 75 to 95 weight percent of an edible low melting triglyceride blend.

4. The edible moisture barrier composition of claim 1, wherein the edible moisture barrier is 20 microns to 1 mm thick.

5. The edible moisture barrier composition of claim 4, wherein the edible moisture barrier is 200 to 500 microns thick.

6. The edible moisture barrier composition of claim 1, wherein the edible microparticulated high melting lipid is selected from the group consisting of stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, high melting phospholipids and mixtures thereof.

7. The edible moisture barrier composition of claim 6, wherein the edible, low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anydrous milkfat, lard, beef fat, acetylated monoglyceride and mixtures thereof.

8. The edible moisture barrier composition of claim 7, wherein the barrier composition comprises:
   from 5 to 25 weight percent of an edible microparticulated high melting lipid having a melting point of 100° C. or higher and a volume average particle size of less than 5 microns, and
   from 75 to 95 weight percent of an edible low melting triglyceride blend.

9. The edible moisture barrier composition of claim 6, wherein the edible microparticulated high melting lipid is calcium stearate.

10. The edible moisture barrier composition of claim 1, wherein the barrier composition has a solids fat content of from 55 to 70 weight percent at a refrigerated storage temperature of a food product onto which the edible moisture barrier composition is applied.

11. The edible moisture barrier composition of claim 1, wherein the barrier composition comprises:
   from 8 to 15 weight percent of an edible microparticulated high melting lipid having a melting point of 100° C. or higher and a volume average particle size of 5 microns or less, and
   from 85 to 92 weight percent of an edible low melting triglyceride blend.

12. The edible moisture barrier composition of claim 1, wherein the barrier composition has a solids fat content of from 60 to 65 weight percent at a refrigerated storage temperature of a food product onto which the edible moisture barrier composition is applied.

13. An edible moisture barrier composition comprising:
   from 1 to 35 weight percent of an edible microparticulated high melting lipid having a melting point of 70° C. or higher and a volume average particle size of less than 10 microns; and
   from 65 to 99 weight percent of an edible low melting triglyceride blend having a melting point of 35° C. or less, the moisture barrier composition having a solid fat content of 50 to 70 weight percent at a storage temperature of about 5° C., a solid fat content of less than 35 weight percent above 37° C. wherein the solid fat content does not change more than 5 weight percent at a storage temperature of 0 to 10° C., the moisture barrier composition having sufficient lipid particles, with a particle size of not more than 0.1 micron, effective to prevent liquid oil in the moisture barrier composition from draining from a fat crystal network formed in the barrier composition, wherein the moisture barrier is effective for reducing moisture migration between foods by at least 90 percent over a 21 day storage period as compared to foods where no moisture barrier is present.

14. The edible moisture barrier composition of claim 13, wherein the edible microparticulated high melting lipid is selected from the group consisting of stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, high melting phospholipids and mixtures thereof.

15. The edible moisture barrier composition of claim 14, wherein the edible microparticulated high melting lipid is calcium stearate.

16. The edible moisture barrier composition of claim 13, wherein the edible, low melting triglyceride blend is selected from the group consisting of coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride and mixtures thereof.

17. The edible moisture barrier composition of claim 13, wherein the edible moisture barrier is 20 microns to 1 mm thick.

18. A method for reducing moisture migration between foods comprising applying a moisture barrier composition to a food product, the moisture barrier composition including;

from 1 to 35 weight percent of an edible microparticulated high melting lipid having a melting point of 70° C. or higher and a volume average particle size of less than 10 microns; and from 65 to 99 weight percent of an edible low melting triglyceride blend having a melting point of 35° C. or less, the moisture barrier composition having a solid fat content of 50 to 70 weight percent at a storage temperature of about 5° C., a solid fat content of less than 35 weight percent above 37° C. wherein the solid fat content does not change more than 5 weight percent at a storage temperature of 0 to 10° C., the moisture barrier composition having sufficient lipid particles, with a particle size of not more than 0.1 micron, effective to prevent liquid oil in the moisture barrier composition from draining from a fat crystal network formed in the barrier composition, wherein the moisture barrier is effective for reducing moisture migration between foods by at least 90 percent over a 21 day storage period as compared to foods where no moisture barrier is present.

19. The method of claim 18, wherein the edible microparticulated high melting lipid is selected from the group consisting of stearic acid, arachidic acid, behenic acid, lignoceric acid, glyceryl monostearate, glycerol distearate, glycerol tristearate, calcium stearate, magnesium stearate, high melting sucrose polyesters, high melting fatty alcohols, high melting waxes, and mixtures thereof.

20. The method of claim 18, wherein the edible, low melting triglyceride blend is selected from the group consisting of natural, hydrogenated, fractionated and modified coconut oil, palm kernel oil, rapeseed oil, soybean oil, palm oil, sunflower oil, corn oil, canola oil, cottonseed oil, peanut oil, cocoa butter, anhydrous milkfat, lard, beef fat, acetylated monoglyceride and mixtures thereof.

21. The method of claim 18, wherein the edible microparticulated high melting lipid is calcium stearate.

22. The method of claim 18, wherein the edible moisture barrier is 20 microns to 1 mm thick.

* * * * *

UNITED STATES PATENT AND TRADEMARK OFFICE
CERTIFICATE OF CORRECTION

| | | |
|---|---|---|
| PATENT NO. | : 7,226,630 B2 | Page 1 of 1 |
| APPLICATION NO. | : 10/304446 | |
| DATED | : June 5, 2007 | |
| INVENTOR(S) | : Loh et al. | |

It is certified that error appears in the above-identified patent and that said Letters Patent is hereby corrected as shown below:

In column 9, line 53, claim 1, after "about" delete "5 C.," and insert -- 5°C., --.

In column 9, line 66, claim 2, delete "milikfat" and insert -- milkfat --.

Signed and Sealed this

Seventh Day of August, 2007

JON W. DUDAS
*Director of the United States Patent and Trademark Office*